A. BLACKFORD & G. McMULLEN.
Track-Clearer.
No. 159,632. Patented Feb. 9, 1875.
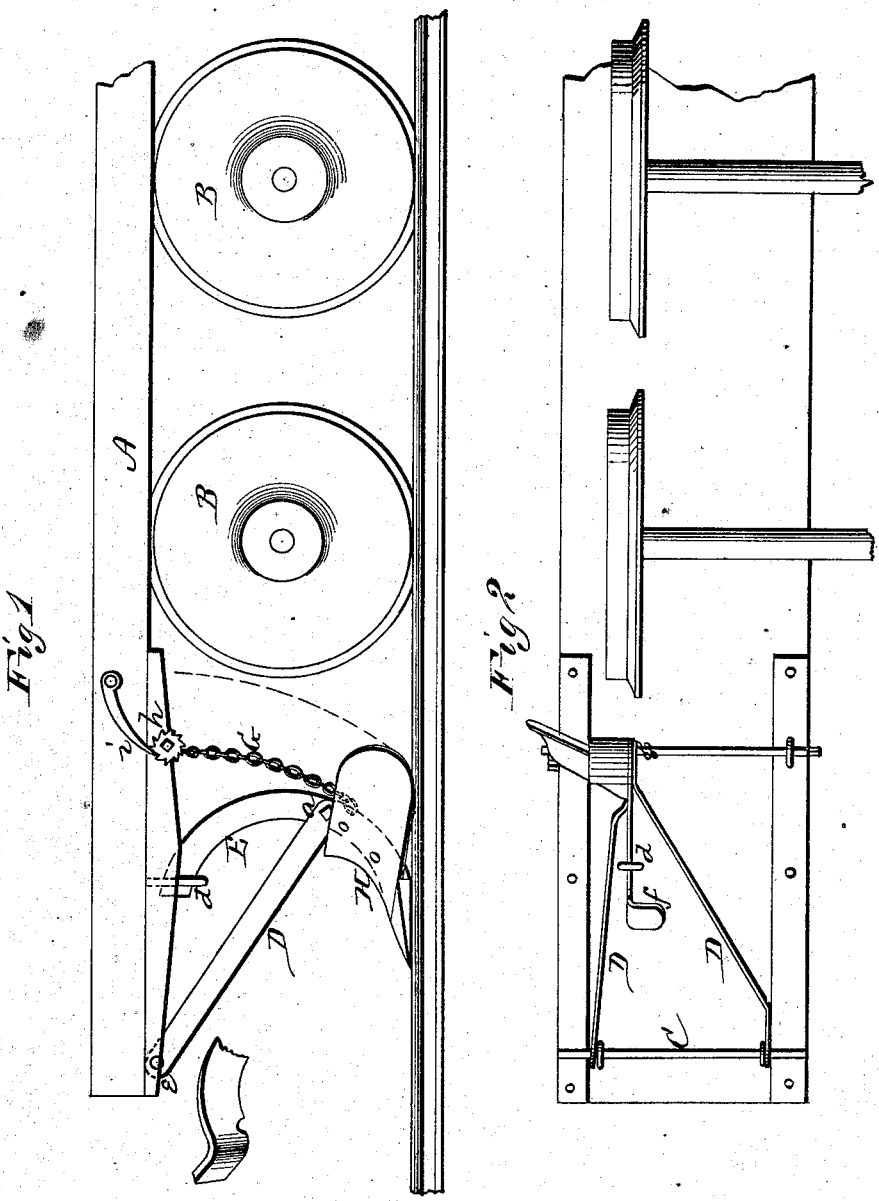

UNITED STATES PATENT OFFICE.

ALBERT BLACKFORD, OF MARLBOROUGH, OHIO, AND GEORGE McMULLEN, OF LANCASTER, PENNSYLVANIA.

IMPROVEMENT IN TRACK-CLEARERS.

Specification forming part of Letters Patent No. 159,632, dated February 9, 1875; application filed January 9, 1875.

*To all whom it may concern:*

Be it known that we, ALBERT BLACKFORD, of Marlborough, Ohio, and GEORGE McMULLEN, of Lancaster, in the county of Lancaster and in the State of Pennsylvania, have invented certain new and useful Improvements in Snow-Plows and Track-Clearers; and do hereby declare that the following is a full, clear, and exact description thereof, reference being had to the accompanying drawings, and to the letters of reference marked thereon, making a part of this specification.

The nature of my invention consists in the employment of an adjustable device forward of the wheels upon car-frames, which will remove snow, dirt, and other obstructions from railroad-tracks, and at the same time pass over immovable obstacles without danger, as will be hereinafter fully set forth.

In the accompanying drawings, making part of this specification, Figure 1 represents a side view, and Fig. 2 a bottom view, of my invention.

In the figures, A represents the bottom of a car-frame, and B B the car-wheels. Across the forward end of the under side of the bottom A passes a rod or bar, C, which is secured in place by any suitable means. D D represent two metallic bars, which are connected adjustably to the rod C, so that a hinged joint is formed. These bars D D pass backward and downward, and are pivoted to a curved guide-bar, E, as seen at $a$. H represents a plow or a plow-point, which is securely fastened to the curved bar E at its lower end. The bar E passes through a guide-loop, $e$, which is connected to the under side of the bottom A. This bar E has upon its upper end a bend or projection, $f$, which acts as a stop and prevents it from drawing out of the stop-loop $d$. G is a chain or cord, which connects to the bar E, near its lower end, and then passes around a shaft connected to the car-body. The chain or cord acts as a means of raising or lowering at pleasure the plow, and the shaft around which it passes is provided with a ratchet-wheel and pawl to hold it at any desired point.

It will be seen that by this arrangement there are two pivots or points upon which the plow turns, one at $e$ and the other at $a$. The pivot or turning-point at $e$ allows the plow to rise; but the pivot at $a$ allows it to partially revolve in addition, so that it can freely pass over obstacles, even in case the point of the plow should have passed under them.

We may use a single point, or we may use a mold-board with our plow for cleaning either dirt or snow from the track of a railroad.

In operation the point of the plow will run close to the track, but will lift itself over immovable obstacles which it may come in contact with. The weight of the plow keeps it down to the track to remove any movable object which may be upon it.

Having thus fully described our invention, what we claim as new, and desire to secure by Letters Patent, is—

The combination of a car-bottom, A, rod C, bars D D, having pivoted ends $e$ and $a$, curved guide-bar E, having projection $f$, plow H, and guide-loop $d$, all substantially as set forth.

In testimony that we claim the foregoing we have hereunto set our hands this 5th day of January, 1875.

ALBERT BLACKFORD.
GEORGE McMULLEN.

Witnesses:
C. H. ALEXANDER,
J. TYLER POWELL.